United States Patent [19]
Penhasi et al.

[11] 3,717,436
[45] Feb. 20, 1973

[54] PROCESS FOR THE SEQUENTIAL DEGRADATION OF PEPTIDE CHAINS

[75] Inventors: Harry A. Penhasi; Henry Meier, both of Cupertino, Calif.

[73] Assignee: Beckman Industries, Inc.

[22] Filed: Jan. 25, 1971

[21] Appl. No.: 109,157

[52] U.S. Cl. ............................................23/230 R
[51] Int. Cl. ...................G01n 31/00, G01n 31/06
[58] Field of Search.............23/230 R, 230 B, 253 R; 134/21

[56] References Cited

UNITED STATES PATENTS 3,536,450  10/1970  Dus et al. ...............................23/253

OTHER PUBLICATIONS

Badger and Banchero, Introduction to Chemical Engineering (1955), pp. 469, 497, 499.

Primary Examiner—Morris O. Wolk
Assistant Examiner—D. G. Millman
Attorney—Stanley M. Teigland and Robert J. Steinmeyer

[57] ABSTRACT

An improvement in the process of sequentially degrading peptide chains in a reaction vessel by successive coupling and cleavage reaction steps, wherein the vessel is subjected to a vacuum purging operation between the reaction steps to remove undesired materials. The improvement involves flushing the vessel with a stream of nitrogen gas while it is under vacuum whereby the undesired materials are more rapidly and more completely removed from the vessel and the cumulative yield of the process is increased.

5 Claims, 2 Drawing Figures

PROCESS FOR THE SEQUENTIAL DEGRADATION OF PEPTIDE CHAINS

BACKGROUND OF THE INVENTION

This invention relates to an improved method for performing the sequential degradation of peptide chains for purposes of analyzing the constituents of the chain.

It is important to analyze the amino acid sequence of proteins and peptides in order to understand their biological functions. For example, the function of insulin is dependent upon its particular amino acid sequence. A variety of techniques may be used to determine the linear order of amino acids. One of the most important sequential methods now being used is called the Edman process. The Edman process was originally described in Acta Chem. Scand. 4, 283 (1950). Three more recent articles describe the form of its current use, Blomback et al., "Human Fibrinopeptides Isolation, Characterization, and Structure," Biochem, Biophys. Acta, 115 (1966) 371–396; Edman and Begg, "A Protein Sequenator," European J. Biochem. 1 (1967) 80–91; Niall et al., "The Amino Acid Sequence of Porcine Thyrocalciton," Proc. of the National Academy of Sciences, Vol. 59 No. 4, pp. 1,321–1,328, April 1968; Niall, "Sequential Analysis of Proteins and Peptides" Fractions No. 2, pp. 1–10 (1969). Briefly, as discussed in the last article and as shown inside the cover of the Fractions publication, the Edman sequential degradation processes involve three stages: coupling, cleavage, and conversion. In the coupling stage phenyl isothiocyanate (PITC) reacts with the N-terminal $\alpha$ amino group of the peptide to form the phenylthiocarbamyl (PTC) derivative. The pH is normally maintained at between 9 and 10 and preferably between 9 and 9.5 for the coupling reaction. In the cleavage step anhydrous acid is used to cleave the PTC derivative, i.e., the anilinothiazolinone (ATZ). After extraction of the thiazolinone the residual peptide is ready for the next cycle of coupling and cleavage reactions. Aqueous acid is used to convert the thiazolinone to the phenylthiohydantoin (PTH) which may be analyzed in an appropriate manner such as by chromatography.

At the end of the coupling step the excess PITC and the organic constituents of the coupling buffer, which is used to maintain the desired environment (such as pH) for the coupling reaction, are removed by extraction with benzene. Certain breakdown products of PITC such as aniline and phenylthiourea are also removed. Diphenylthiourea, another side product, is poorly soluble in benzene but may be removed by further extraction with a more polar organic solvent such as ethyl or butyl acetate. The water from the coupling buffer must also be removed, for example by lyophilization. The reaction vessel is then subjected to a vacuum purging operation to remove any remaining undesired materials and the dried protein as its PTC derivative is then ready for cleavage.

During the cleavage operation the protein is dissolved in anhydrous acid, for example trifluoroacetic acid. Thus there is a strong shift in pH from basic for the coupling reaction to acidic for the cleavage reaction. The acid is then evaporated and the cleaved thiazolinone derivative is separated from the residual peptide by extraction with butyl chloride or ethylene dichloride. After evaporation of residual solvent and a further vacuum purging operation, the peptide or protein, now one residue shorter, is ready for the next cycle.

In the typical apparatus used to perform the coupling and cleavage steps, each series constituting a cycle, the steps may be broken down into seven stages. A typical apparatus for accomplishing this is the Beckman Protein Peptide Sequencer. The first of the seven stages is the coupling to the protein. This is followed by two wash stages giving precipitation of the sample along with a primary extraction of excess reagents and a secondary extraction of excess reagents. The cleavage stage, cleaving the amino acid residue on the end of the protein comes next. This is followed by a first extraction which extracts the cleaved amino acid residue. If desired, to be sure that all of the amino acid residue has been cleaved, a second cleavage step may be used followed by a second extraction step.

In the Edman or Beckman type instrument all the functions are performed in a continuously spinning cylindrical cup which comprises the reaction vessel. The protein spreads as a thin film over the surface of the lower half of the cup. Reagents are pumped in so as to flow over the proteins. The movement of one thin film over another is almost ideal for rapid solution, reaction, and extraction maneuvers. Solvent extractions are carried out by allowing the liquid to flow up over the surface of the dried protein to the top of the cup where it reaches a groove in the surface of the cup and can be scooped off. The spinning of the cup also helps to reduce the tendency of material to boil during evaporation of liquids. A nonvolatile base such as that known in the trade as Quadrol, a registered trademark of Wyandot Chemical Corporation, may be used in the coupling buffer and an acid of low volatility is used for cleavage. Thus heptafluoro-butyric acid may be used instead of its more volatile analog trifluoroacetic acid. Quadrol is N,N,N',N' - tetrakis - [2-hydroxypropyl] - ethylene diamine. A typical Quadrol buffer is a one molar solution of Quadrol in a 50–50 mixture of propanol and water with the pH adjusted to 9.0 by trifluoroacetic acid.

One continuing problem has been loss of sample during the various extraction and reaction steps of each cycle. It is difficult to remove all undesired materials completely from the reaction vessel at the end of each step. Remaining materials can adversely affect the reactions in the next step of the process. For example the carry-over of residual amounts of water and base from the coupling step can interfere with the cleavage reaction which must occur in an anhydrous acid environment. The results of this interference and altered environment show up in overlap and reduced yield of subsequent cycles. At the end of each cycle the amount of sample remaining for the succeeding cycles is lower than desired. This influences the number of cycles that can be carried out. Since proteins or peptides can be many cycles or amino acid residues in length, it is desired to be able to perform as many cycles as possible. A so-called 1 percent confidence level is normally used. That is, the yield of material from any given cycle to produce accurate or usable results must be at least 1 percent of the yield from the initial cycle over and above the background. With respect to the degradation of peptides, this has usually placed a limit of 20 to 25 cycles upon the degradation sequence. The reason for this is that the gradual fall in yield is accompanied by a gradual appearance of a background of other PTH amino acids due mainly to incomplete reactions, physical loss in washing, and random cleavages along the peptide chain. This combination of a falling signal with a rising noise level makes identification impossible after a finite number of cycles.

SUMMARY OF THE INVENTION

It is an object of the instant invention to provide an improved process for sequentially degrading peptide chains whereby undesired materials are more rapidly and more completely removed from the reaction vessel at the end of each stage of the process so that the yield of the process is increased and the sequence of degradation cycles can be extended. It is an advantage of the instant invention that the number of cycles through which the degradation sequence may be carried out before the 1 percent yield level, as explained previously, is reached is significantly increased.

The process of the instant invention involves sequentially degrading peptide chains in a reaction vessel by successive coupling and cleavage reaction steps constituting a cycle. The vessel is subjected to a vacuum purging operation between reaction steps to remove undesired materials. The improvement comprises flushing the vessel with a stream of nitrogen gas while it is under vacuum so that the undesired materials are removed more rapidly and more completely from the vessel. As a result the cumulative yield of the process and the yield per cycle are both increased.

Typically the vacuum level is from about 450 to about 550 microns of mercury and the flow rate of nitrogen is about 100 cubic centimeters per minute. The preferred vacuum level is about 500 microns of mercury. When the instant invention is practiced a cycle will take about 70 to 90 minutes. The nitrogen stream desirably passes over substantially the entire surface area of the material in the reaction vessel.

BRIEF DESCRIPTION OF THE DRAWING

Other objects and advantages of this invention will be apparent from the description taken in conjunction with the accompanying drawing.

DETAILED DESCRIPTION

Figure 1:
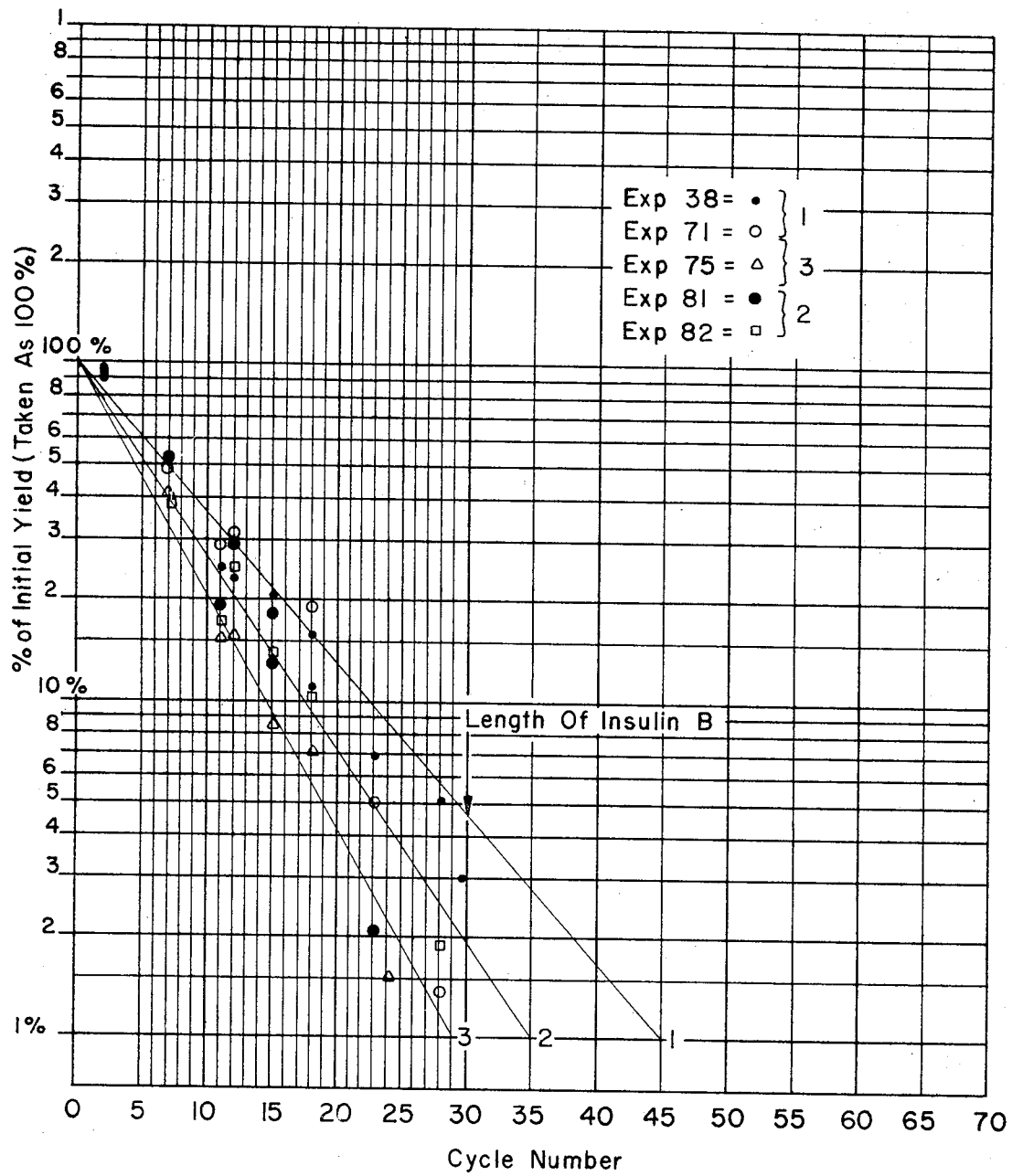
FIG. 1 is a graph comparing the yield per cycle in typical sequential degradations of insulin B with and without the practice of the instant invention.

A series of comparative sequential degradations were performed using the Beckman Protein Peptide Sequencer as described in the Niall article in Fractions mentioned above. All tests were performed upon insulin chain B. Insulin chain B is known to have 30 residues and is the larger of the two subunits of insulin. It may be described as having a phenylalanine amino terminal and two cystane residues which form bridges with insulin chain A. Heptafluorobutyric acid was used in the cleavage steps in all runs. Phenylisothiocyanate was used in the coupling reactions and different buffers were utilized. Table I sets forth the operating conditions and repetitive yields with the weighted average yield and Table II sets forth the yields per cycle as a percentage of the first cycle yield in the compared experiments.

TABLE I

Insulin B

| exp. no. | $N_2$ flush | buffer | program | initial yield | repetitive yields-% | | | | wtd. ave. yield |
|---|---|---|---|---|---|---|---|---|---|
| | | | | | 2-12 | 6-11 | 11-15 | 12-18 | |
| 38 | Yes | A | 12 | 38.0% | 87.1 | 89.5 | 95 | 93.2 | 90.4 |
| 71 | Yes | C | 12 | 49.0 | 90 | | 90 | 89 | 92.5 | 90 |
| 75 | No | C | 13 | 46.0 | 84 | | 81 | 86 | 87 | 84.5 |
| 81 | No | E | 14 | 47.2 | 89 | | 83 | 90 | | 87 |
| 82 | No | C | 14 | 43.2 | 87 | | 84 | 95 | | 89 |

TABLE II

Yield Per Cycle-% of First Cycle Yield

| exp. no. | 2 | 6 | 11 | 12 | 15 | 18 | 23 | 28 |
|---|---|---|---|---|---|---|---|---|
| 38 | 92.2 | 43.7 | 24.5 | 23.5 | 20.3 | 15.3 | 6.9 | 5.1 |
| 71 | 93 | 49.7 | 29.8 | 32.8 | 18.7 | 19.2 | 4.7 | 1.3 |
| 75 | 89.2 | 43.2 | 15.4 | 15.7 | 8.6 | 7.1 | 1.5 | |
| 81 | 90.2 | 50.5 | 19.6 | 30.0 | 12.9 | 10.5 | 2.1 | |
| 82 | 89.7 | 41.4 | 16.8 | 23.4 | 13.5 | 10.4 | | 1.9 |

Buffer A contained three parts of triethylamine to 55 parts of proponol and 42 parts of water and was used to set the pH at 9.7. Buffer C contained 12 parts of dimethylallylamine to 44 parts of proponol and 44 parts of water giving a pH during the coupling operation of 10.85. Buffer E contained 12 parts of dimethylallyamine to 44 parts of pyridine and 44 parts of water giving a pH of 9.5.

Benzene was used as the wash liquid in the extraction operation after the coupling step. Butyl chloride was used as a secondary extractant wash liquid. Following the cleavage operation the cleaved thiazolinone derivative was separated from the residual peptide by extraction with butyl chloride.

The conversion operations were performed separately and the various groups identified in accordance with standard chromatographic techniques. The conversion and identification operations form no part of the instant invention and need not be discussed further here.

One hundred cc per minute of nitrogen with 450 to 550 desirably 500 microns of mercury vacuum measured at the pump seem to work quite well and was generally used in the tests for the nitrogen flushing operation.

As shown in the Table, three different programs were used, programs 12, 13, and 14. Program 12 involved a cycle having a single cleavage step with nitrogen flushing, the cycle lasting approximately 76 minutes. Program 13 also involved a single cleavage with no nitrogen flushing, but with the vacuum purging operation between reaction steps, the cycle taking approximately 97 minutes, a difference of 21 minutes. Program 14 involved a single cleavage with an optional double cleavage being permitted. The program could be run both with or without nitrogen flushing between reaction steps. When no nitrogen flushing was used the reaction cycle averaged approximately 96 minutes. When nitrogen flushing was used a reaction cycle normally took about 80 minutes, a difference of 16 minutes. In the experiments shown in the Table, program 14 was run without nitrogen flushing.

FIG. 1 is a graph comparing weighted yields per cycle as a percent of the initial yields. Line 3 represents experiment 75, which was performed without nitrogen flushing, hits the 1 percent yield level at the end of the twenty-ninth cycle. This is barely satisfactory for an analysis of insulin chain B which has thirty residues. Line 2 represents experiments 81 and 82, which were performed without nitrogen flushing but with a double cleavage, showed somewhat better results in that a complete analysis of insulin B was possible. The 1 percent level is reached by extrapolation at about cycle 35, which indicates a peptide chain having 35 residues could be successfully analyzed. Line 1 represents the results of experiments 38 and 71, both of which used nitrogen flushing in the vacuum purging steps between reaction steps, shows a 4 ½ percent yield at the end of insulin chain B and extrapolates to the 1 percent level at 45 cycles. This indicates a peptide chain of 45 residues could be successfully analyzed utilizing the instant invention, a significant improvement over the comparable process without nitrogen flushing.

The runs with nitrogen flushing had a weighted average yield of 90 percent or better, significantly superior to the comparable run 75, which had a weighted average yield of 84.5 percent. The experiments utilizing a double cleavage step showed improved yields over the similar program with a single cleavage but did not attain the results of the single cleavage program with nitrogen flushing. It is further significant that the repetitive or cumulative yields for experiments 38 and 71, the experiments which utilized nitrogen flushing in the vacuum purging operation, were significantly higher than those of experiment 75, which used no nitrogen flushing, and were generally higher than those of experiments 81 and 82, which used a double cleavage operation with no nitrogen flushing.

Figure 2:
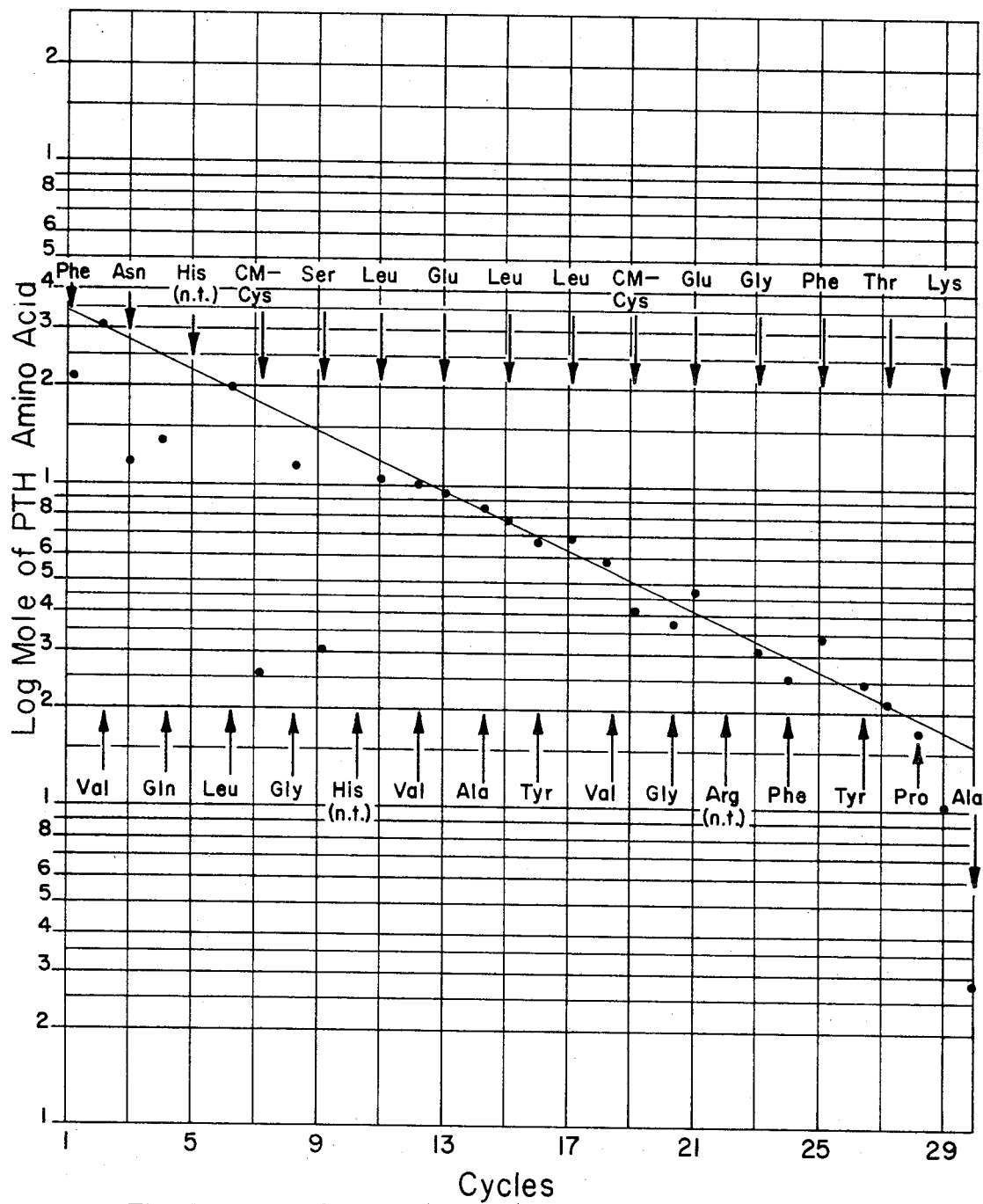
FIG. 2 is a graph showing the identification and yield of each peptide residue for insulin B as determined utilizing the instant invention.

FIG. 2 is a graph showing the identification and yield of each peptide residue for insulin B as determined in experiment 38. The amount of each residue analyzed is plotted as the log mole of the phenylthiohydantoin. The name of each residue and its abbreviation is shown in Table III.

TABLE III

| | |
|---|---|
| Phenylalinine - Phe | Glycine - Gly |
| Asparagine - Asn | Threonine - Thr |
| Histidine - His | Lysine - Lys |
| Carboxylmethyl-cysteine-CM-Cys | Valine - Val |
| Serine - Ser | Glutamine - Glu |
| Leucine - Leu | Alanine - Ala |
| Argininl - Arg | Tyrosine - Tyr |
| Glutamic Acid - Glu | Proline - Pro |

The quantity of each residue is plotted with the exception of His and Arg. The presence of these residues could be determined qualitatively but the amount could not be determined quantitatively utilizing the standard chromatographic techniques. The graph illustrates that, utilizing this invention, adequate quantities of all residues were present for the identification of the residues. This further illustrates the utility of the instant invention.

In all steps, the nitrogen stream was passed into the cup-shaped reaction vessel along the axis thereof so that the nitrogen stream passed over substantially the entire surface area of the material in the reaction vessel, which in the description of the sequencer operation was stated to be present as a thin film over the surface of the lower half of the cup or reaction vessel.

It is believed the use of a nitrogen flushing operation in connection with the vacuum purging made possible the more complete removal of the undesired materials at the end of each reaction step. This permitted the succeeding reaction step to proceed under the desired conditions with a minimum deviation therefrom and with a minimum of interference present to cause background reactions. As a result the rise of noise level and fall of signal was less for each cycle and identification of residues was possible for more cycles.

It will be appreciated that the foregoing is a description of exemplary processes according to the instant invention. This is for illustrative purposes only, and the instant invention is not to be limited thereby, but only by the claims wherein:

What is claimed is:

1. In the process of sequentially degrading peptide chains in a reaction vessel by successive coupling and cleavage reaction steps, constituting a cycle, wherein the vessel is subjected to a vacuum purging operation between reaction steps to remove undesired materials, the improvement which comprises flushing the vessel with a stream of nitrogen gas while it is under vacuum whereby the undesired materials are more rapidly and more completely removed from the vessel and the cumulative yield of the process is increased.

2. The process of claim 1 wherein each reaction cycle takes from about 70 to about 90 minutes.

3. The process of claim 1 wherein the nitrogen stream passes over substantially the entire surface area of the material in the reaction vessel.

4. The process of claim 1 wherein the vacuum level is from about 450 to about 550 microns of mercury and the flow rate of nitrogen is about 100 cubic centimeters per minute.

5. The process of claim 4 wherein the vacuum level is about 500 microns of mercury.

* * * * *